United States Patent
DeRosa et al.

(10) Patent No.: US 9,778,130 B2
(45) Date of Patent: Oct. 3, 2017

(54) DIFFERENTIAL PRESSURE TRANSDUCER WITH INSPECTABLE WELDS

(71) Applicant: Kulite Semiconductor Products, Inc., Leonia, NJ (US)

(72) Inventors: Lou DeRosa, Wayne, NJ (US); Steven Kleiber, Highland Lakes, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 102 days.

(21) Appl. No.: 14/927,837

(22) Filed: Oct. 30, 2015

(65) Prior Publication Data

US 2017/0122827 A1    May 4, 2017

(51) Int. Cl.
*G01L 7/00* (2006.01)
*G01L 19/14* (2006.01)
*G01L 19/00* (2006.01)
G01L 13/02 (2006.01)
G01L 9/00 (2006.01)

(52) U.S. Cl.
CPC ........ *G01L 19/142* (2013.01); *G01L 19/0038* (2013.01); *G01L 9/0052* (2013.01); *G01L 13/025* (2013.01)

(58) Field of Classification Search
CPC ..... G01L 9/0052; G01L 13/02; G01L 13/025; G01L 19/0007; G01L 19/0038; G01L 19/14; G01L 19/142; G01L 19/147

USPC ........ 73/715, 716, 717, 719, 720, 721, 723, 73/725, 726, 727, 756
See application file for complete search history.

(56) References Cited

U.S. PATENT DOCUMENTS

| | | | |
|---|---|---|---|
| 2005/0072242 A1* | 4/2005 | Fandrey | G01L 19/0007 73/706 |
| 2009/0078742 A1* | 3/2009 | Pasquali | G01N 29/225 228/103 |
| 2013/0220029 A1* | 8/2013 | Gardner | G01L 15/00 73/862.52 |
| 2014/0144243 A1* | 5/2014 | Tanaka | G01L 13/025 73/716 |

* cited by examiner

*Primary Examiner* — Benjamin Schmitt
(74) *Attorney, Agent, or Firm* — Troutman Sanders LLP; James E. Schutz; Mark Lehi Jones

(57) ABSTRACT

Certain implementations of the disclosed technology include a differential pressure transducer and method of assembly. The differential pressure transducer includes: a housing having a first pressure port and a second pressure port; a header welded to the housing; a cap welded to the header; a sensor module disposed in the header and in communication with first pressure port and the second pressure port. The sensor module includes a diaphragm having a first side and a second side. The first side is configured to receive a first pressure by the first pressure port, and the second side is adapted to receive a second pressure by the second pressure port. The differential pressure transducer also includes a reference tube configured to communicate the second pressure from the second pressure port to the diaphragm second side. The reference tube is welded to a portion of the header with an inspectable weld.

11 Claims, 4 Drawing Sheets

DIFFERENTIAL PRESSURE TRANSDUCER WITH INSPECTABLE WELDS

TECHNICAL FIELD

The disclosed technology relates to pressure transducers, and more particularly, to a differential pressure transducer with inspectable welds.

BACKGROUND

A differential pressure transducer is a device that provides an output indicative of a difference between two input pressures. For example, when a first pressure $P_1$ is applied to one face of a deflecting diaphragm and a second pressure $P_2$ is applied to an opposite face of the diaphragm the resulting deflection is related to the difference in pressure (for example, $P_1-P_2$) and corresponding pressure differential can be determined from the deflection.

Differential pressure transducers are used in a variety of applications, including filtering, pumping, hydraulics, etc., where accurate pressure differential measurements are critical to the proper performance of the system. Often these applications involve media that can be corrosive to certain sensor components, diaphragms, etc. Such sensitive components are often isolated from the surrounding harsh environments by oil-filled regions in communication with input pressure ports, tubes, etc., so that incoming pressure can be transmitted through the pressure ports, through the tubes, to the oil-filled regions, and to respective diaphragms and associated components for measurement.

Current designs and manufacturing methods can work well for certain transducer assemblies that are used in relatively low pressure, static, and quasi-static applications. However, failures can frequently occur in transducers that are exposed to high-pressure environments and/or to large numbers of pressure cycles. Such failures can occur in the various ports, tubes, joints, interfaces, etc. of the transducer assembly, particularly when the associated connecting welds are done without the benefit of inspection for defects.

BRIEF SUMMARY

Certain example implementations of the disclosed technology include a differential pressure transducer and method of assembly. The differential pressure transducer includes: a housing having a first pressure port and a second pressure port; a header welded to the housing; a cap welded to the header; a sensor module disposed in the header and in communication with first pressure port and the second pressure port. The sensor module includes a diaphragm having a first side and a second side. The first side is configured to receive a first pressure by the first pressure port, and the second side is adapted to receive a second pressure by the second pressure port. The differential pressure transducer also includes a reference tube configured to communicate the second pressure from the second pressure port to the diaphragm second side. The reference tube is welded to a portion of the header with an inspectable weld.

The disclosed technology includes a method for assembling a differential pressure transducer assembly with inspectable welds. The method includes: welding a first end of a reference tube to a portion of a reference pressure port associated with a housing of a differential pressure transducer assembly. The welding produces a first inspectable weld that joins the first end of the reference tube and the portion of the reference pressure port. The method includes inspecting the first inspectable weld. The method further includes inserting a second end of the reference tube through a reference bore in a header of the differential pressure transducer; securing the header to the housing; welding the second end of the reference tube to a portion of the reference bore, wherein the welding produces a second inspectable weld that seals an outer circumference of the reference tube to an inner circumference of the reference bore; and inspecting the second inspectable weld.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Figure 1:
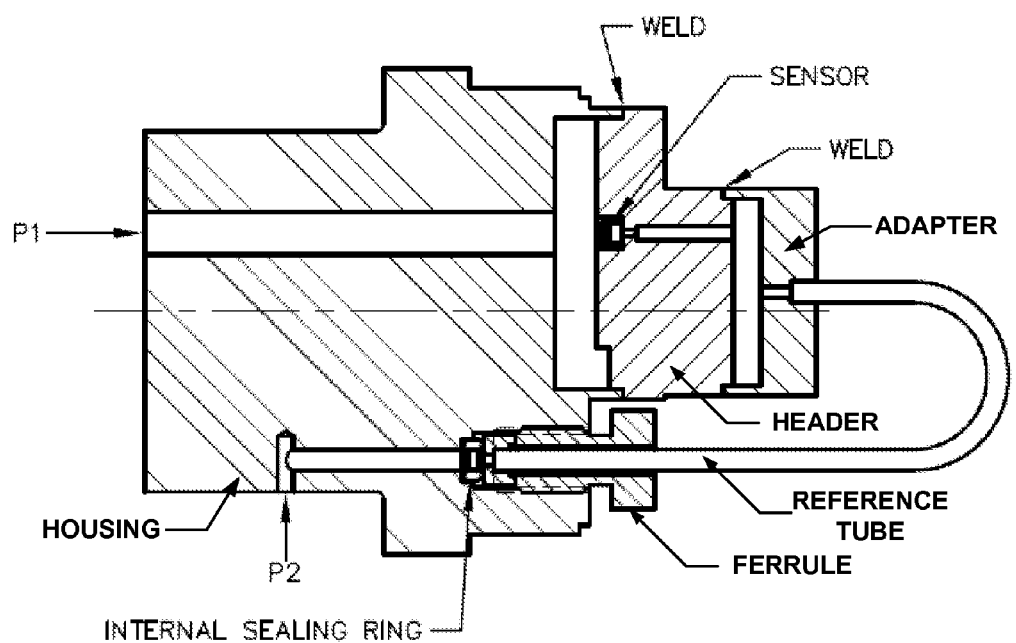
FIG. 1 illustrates a prior art differential pressure sensor assembly 100.

Certain example implementations of the disclosed technology may be utilized to improve the reliability of pressure transducer assemblies. Certain example embodiments disclosed herein provide new sensor designs and a manufacturing methods that can enable inspection of certain joints, welds, brazes, interfaces, etc., associated with one or more ports, tubes, and/or other components in a pressure transducer assembly.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The disclosed technology is capable of other embodiments and of being practiced or carried out in various ways. Also, in describing the preferred embodiments, specific terminology will be resorted to for the sake of clarity. In describing the preferred embodiments, certain terminology is used herein for the sake of clarity. It is intended that each term contemplates its broadest meaning as understood by those skilled in the art and includes all technical equivalents which operate in a similar manner to accomplish a similar purpose.

The mention of one or more method steps does not preclude the presence of additional method steps or intervening method steps between those steps expressly identified. Similarly, the mention of one or more components in a device or system does not preclude the presence of additional components or intervening components between those components expressly identified.

Referring now to the drawings, in which like numerals represent like elements, certain example implantations of the disclosed technology are described herein. Certain prior art designs are presented in FIG. 1 and FIG. 2, for example, to provide perspective for the tangible benefits and improvements over the prior art. Certain example implementations of the disclosed technology are depicted and discussed with respect to FIG. 3 and FIG. 4.

It is to be understood that the figures and descriptions of the present invention have been simplified to illustrate elements that are relevant for a clear understanding of the present invention, while eliminating, for purposes of clarity, many other elements found in typical pressure sensor assemblies and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

FIG. 1 illustrates a conventional prior art design and methodology for manufacturing a dual isolation diaphragm differential pressure transducer 100. In this example, a differential pressure sensor is mounted to a header which is then oil filled. This header is then welded onto a housing. The configuration of the header and the housing can allow this particular weld joining the header and the housing to be fully inspected for defects. Then a reference tube adaptor is welded onto the back of the header. Again, this particular weld joining the adapter with the header can be fully inspected. The reference tube is then welded or brazed into the adaptor. This weld/braze joining the reference tube to the adapter can also be fully inspected. Finally, the second end of the reference tube is connected to the housing with a sealing ring clamped by a ferrule. Because the sealing ring is imbedded in the housing, this particular prior art design does not enable inspection of the ring or the associated interface to make sure that it is fully sealed, or to verify that there are no weak points or defects. Over time, high cyclic pressure may cause the sealing ring to fail which can cause a leak internal to the pressure transducer, resulting in measurement inaccuracies, failure, or both.

Figure 2:
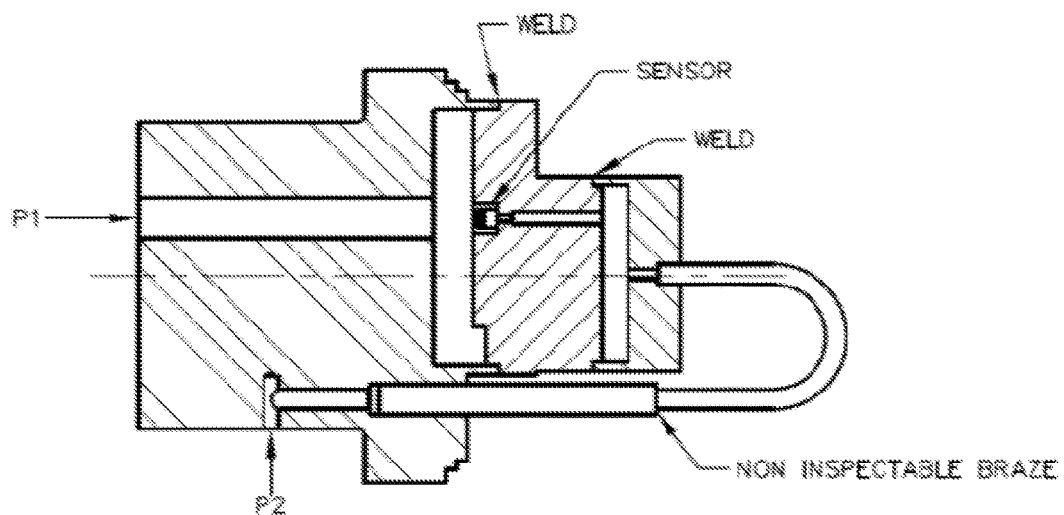
FIG. 2 illustrates another prior art differential pressure sensor assembly 200.

FIG. 2 illustrates another conventional prior art design and methodology for manufacturing a dual isolation diaphragm differential pressure transducer 200. As previously discussed with respect to FIG. 1, a sensor is mounted to a header which can be oil filled on both sides. The header is welded onto the housing, and this particular weld can be inspected. An adaptor is then welded to the back of the port, and this weld can also be inspected. The reference tube is welded or brazed to the header, and this weld/braze can be inspected. In this prior art design, the reference tube is then brazed into the housing either directly or through an adaptor as shown in FIG. 2. Because the associated port (through which the pressure P2 communicates with the tube) covers one side of the brazed joint, this particular prior art design does not enable inspection of the braze, and defects in the braze may cause a failure over time, particularly with high cyclic loading.

Figure 3:
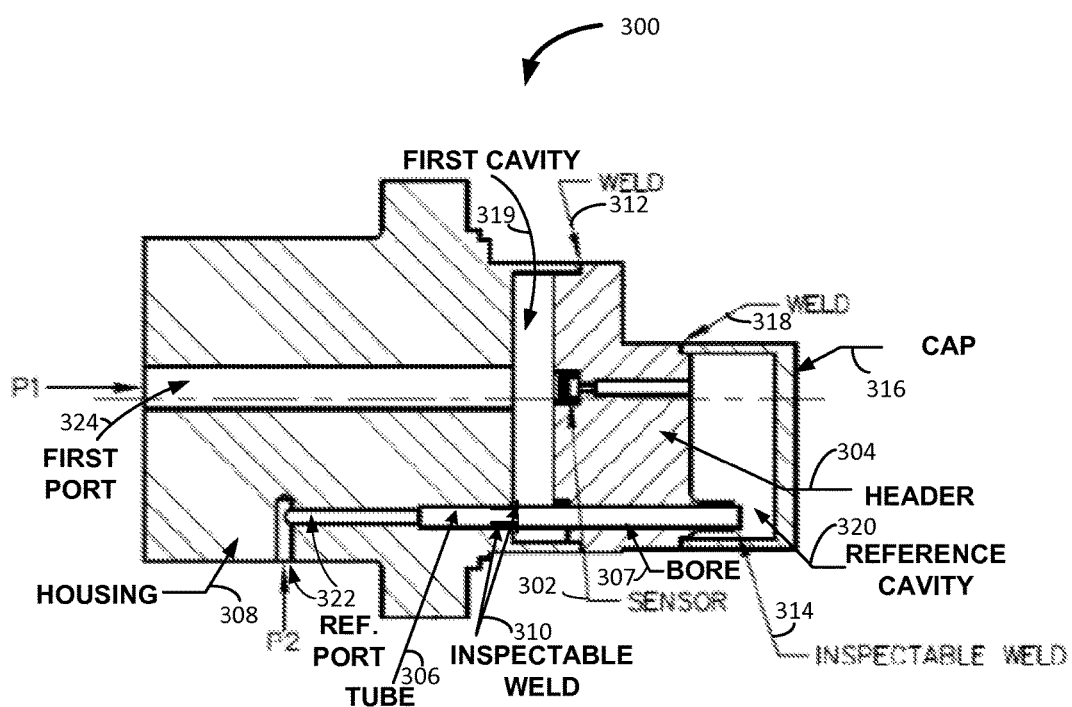
FIG. 3 is a cross-sectional view of differential pressure sensor assembly 300 having inspectable welds, according to an example implementation of the disclosed technology.

FIG. 3 depicts a differential pressure sensor apparatus 300 according to an example implementation of the disclosed technology. In this example embodiment, a differential sensor module 302 may be mounted on a header 304. In one example implementation, a reference tube 306 may be attached to a housing 308 with a braze or weld 310. As used herein, the term "weld" may refer to a weld, a braze, and/or a seal joining two or more components. As will be further discussed below, and with reference to an example assembly process of the apparatus 300, the reference tube 306 may be attached to the housing 308 before the header 304 is installed so that the weld 310 is not blocked by the header 304, and so the weld 310 is fully inspectable. For example, and as depicted in FIG. 3, a fully inspectable weld 310 may be made at the interface of the reference tube 306, the housing 308 and first cavity 319 such that this weld 310 (joining the a portion of the reference tube 306 with a back end portion of the housing 308) may be made and fully inspected before attaching the header 304 to the housing 308.

In accordance with various example implementations of the disclosed technology, the term "inspectable" can mean that the referenced item (such as a weld or braze) may be installed such that it is unobstructed for viewing, inspecting, and/or examining. In certain example implementations, a weld may be at least temporarily inspectable, for example during assembly, and/or before other associated components are installed that might obstruct viewing, inspecting, or examining the weld. For example, certain disclosed implementations of the disclosed technology provide a weld that is not hidden or blind, and so at least at least a surface of the weld joining two or more components can be inspected. In one example implementation, the weld may be inspected optically. In another example implementation, the weld may be inspected ultrasonically. Other forms of inspection may be utilized without departing from the scope of the disclosed technology. The various implementations of the disclosed technology, assembly design, and/or method of assembly can provide a clear path to the weld so that the associated inspection equipment (optical scope, ultrasonic probe, etc.) can reach, view, or otherwise interact with the weld. In certain example implementations, at least an outer surface of the weld may be inspectable.

In an example implementation, after the reference tube 306 is attached to the housing 308 and after the weld 310 is inspected, the header 304 can then be welded 312 onto the housing 308 with an inspectable weld. In an example implementation, the reference tube 306 may extend through a corresponding bore 307 in the header 304. The reference tube 306, for example, may then be attached to an interface at the bore 307 and the back of the header 304 with another fully inspectable weld 314.

In one example implementation, welding 312 the header 304 to the housing 308 may create a first cavity 319 defined between header 304 and the housing 308. In certain example implementations, the first cavity 319 may be filled with oil and sealed, for example to provide the sensor module 302 with protection from the environment, while allowing a first pressure P1 from the first pressure port 324 to communicate with a first side of the sensor module 302.

In an example implementation, a cap 316 may be attached to the back of the header 304 with another inspectable weld 318, for example, to form a reference pressure cavity 320. In certain example implementations, the installation of the cap 316 may enclose the back of the header 304 and may completely enclose (and protect) the reference tube 306 within the assembly 300.

In an example implementation, the reference pressure cavity 320 may be configured, for example, to connect a second pressure port (i.e., reference pressure port) 322 through the reference tube 306 to a rear portion of the header 304 (through the reference pressure cavity 320) and to a second side of the sensor module 302. In this manner, a reference pressure P2 may be communicated to the backside of the sensor module 302. In one example implementation, the reference pressure cavity 320 may be filled with oil, for example to provide the sensor module 302 with protection from the environment while communicating the reference pressure P2 from the reference pressure port 322 to a second side of the sensor module 302.

According to an example implementation of the disclosed technology, a first pressure P1 may enter the housing 308 via a first port 324, and this first pressure P1 may be in communication a front side of a diaphragm in the differential sensor module 302. In an example implementation, the reference pressure P2 may be in communication with the backside of the diaphragm of the differential sensor module 302. The resulting deflection of the diaphragm may be related to the difference in pressure (for example, $P_1$-$P_2$) and a corresponding pressure differential measurement can be determined from the deflection.

Certain example implementations of the disclosed technology can provide certain advantages and benefits over the prior art. For example, in accordance with certain example implementations of the disclosed technology, the reference tube 306 need not be bent to connect the reference port 322 with the backside of the sensor module (as is the case with the prior art, and as shown in FIG. 1 and FIG. 2). Furthermore, certain example implementations of the disclosed technology may allow the reference tube 306 to be completely enclosed inside the assembly 300 so that there is no chance of damage or kinking during assembly or use.

Figure 4:
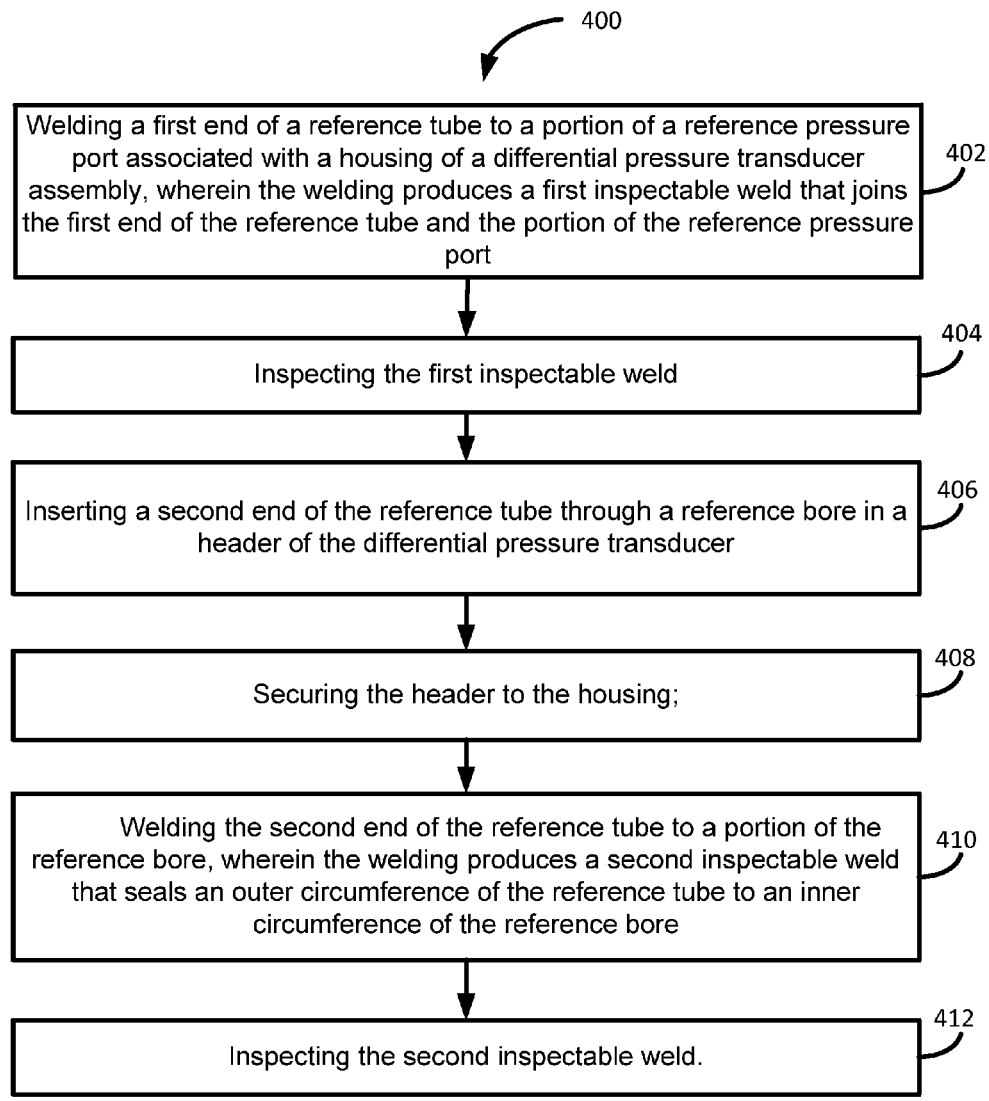
FIG. 4 is a flowchart of a method 400 according to an example implementation of the disclosed technology.

FIG. 4 is a flowchart of a method 400 for assembling a differential pressure transducer assembly with inspectable welds, according to an example implementation of the disclosed technology. The method 400 includes welding 402 a first end of a reference tube to a portion of a reference pressure port associated with a housing of a differential pressure transducer assembly, where the welding 402 produces a first inspectable weld that joins the first end of the reference tube and the portion of the reference pressure port. The method 400 includes inspecting 404 the first inspectable weld. The method 400 includes inserting 406 a second end of the reference tube through a reference bore in a header of the differential pressure transducer. The method 400 includes securing 408 the header to the housing. The method 400 includes welding 410 the second end of the reference tube to a portion of the reference bore, wherein the welding produces a second inspectable weld that seals an outer circumference of the reference tube to an inner circumference of the reference bore. The method 400 includes inspecting 412 the second inspectable weld.

In certain example implementations, securing the header to the housing forms a first cavity between the housing and the header. In certain example implementations, the first cavity is configured to communicate a pressure received from the first pressure port in the housing to a sensor disposed in the header.

In certain example implementations, the method can include securing a cap to the header. In an example implementation, securing the cap to the header can include welding the cap to the header, wherein the welding forms a reference pressure cavity, and wherein the reference pressure cavity is configured to communicate a pressure received from the reference pressure port to a sensor disposed in the header. In certain example implementations, securing the cap to the header fully encloses the reference tube in the differential pressure transducer assembly.

Certain example implementations include installing a sensor module in the header, the sensor module including a diaphragm having a first side and a second side, wherein the first side is configured to receive a first pressure from a first pressure port, and the second side is configured to receive a second pressure from the second (or reference) pressure port.

In certain example implementations, securing the header to the housing can include welding a portion of the header to a portion of the housing with an inspectable weld. In certain example implementations, the inspectable weld is inspected prior to securing the header to the housing.

According to an example implementation of the disclosed technology, a first cavity may be defined between the header and the housing. In certain example implementations, the first cavity may be filled with oil.

According to an example implementation of the disclosed technology, a differential pressure transducer is provided that includes: a housing having a first pressure port and a second pressure port; a header welded to the housing; a cap welded to the header; a sensor module disposed in the header and in communication with first pressure port and the second pressure port. The sensor module includes a diaphragm having a first side and a second side. The first side is configured to receive a first pressure by the first pressure port, and the second side is adapted to receive a second pressure by the second pressure port. The differential pressure transducer also includes a reference tube configured to communicate the second pressure from the second pressure port to the diaphragm second side. The reference tube is welded to a portion of the header with an inspectable weld.

In an example implementation, the reference tube is joined to the second pressure port with an inspectable braze or weld. In certain example implementations, inspectable weld is inspected prior to the header being welded to the housing.

According to an example implementation of the disclosed technology, the sensor module includes a piezoresistive element. In an example implementation, the piezoresistive element can include Wheatstone bridge. In certain example implementations, the piezoresistive element can include at least one piezoresistor.

In certain example implementations, a cap may be welded to the header to form a reference pressure cavity. In certain example implementations, the reference pressure cavity can be oil-filled.

In an example implementation, a first cavity may be defined between the header and the housing. The first cavity may be configured for communicating pressure from a first pressure port to a first side of the diaphragm. In certain example implementations, the first cavity may be oil-filled.

In an example implementation, a diaphragm associated with the sensor module is configured to receive the first pressure by a first oil-filled volume, and the diaphragm is configured to receive the second pressure by a second oil-filled volume.

In an example implementation, the sensor module is adapted to output a signal indicative of a difference between the first pressure and the second pressure.

Numerous characteristics and advantages have been set forth in the foregoing description, together with details of structure and function. While the disclosed technology has been presented in several forms herein, it may be apparent to those skilled in the art that many modifications, additions, and deletions, especially in matters of shape, size, and arrangement of parts, can be made therein without departing from the spirit and scope of the disclosure and its equivalents as set forth in the following claims. Therefore, other modifications or embodiments as may be suggested by the teachings herein are particularly reserved as they fall within the breadth and scope of the claims. It is intended that the disclosed technology cover the modification and variations of the disclosed technology, provided they come within the scope of the appended claims and their equivalents.

The invention claimed is:

1. A differential pressure transducer, comprising:
   a housing comprising a first pressure port and a second pressure port;
   a header welded to the housing;
   a cap welded to the header;
   a sensor module disposed in the header and in communication with the first pressure port and the second pressure port, the sensor module comprising:
      a diaphragm having a first side and a second side, wherein the first side is configured to receive a first pressure by the first pressure port, and the second side is adapted to receive a second pressure by the second pressure port; and
   a reference tube configured to communicate the second pressure from the second pressure port to the diaphragm second side, wherein the reference tube is welded to a portion of the header with an inspectable weld.

2. The differential pressure transducer of claim 1, wherein the reference tube is joined to the second pressure port with an inspectable braze or weld.

3. The differential pressure transducer of claim 1, wherein the inspectable weld is inspected prior to the header being welded to the housing.

4. The differential pressure transducer of claim 1, wherein the sensor module comprises one or more piezoresistive elements.

5. The differential pressure transducer of claim 4, wherein the one or more piezoresistive elements comprises a Wheatstone bridge including at least one piezoresistor.

6. The differential pressure transducer of claim 1, wherein the cap welded to the header forms a reference pressure cavity.

7. The differential pressure transducer of claim 6, wherein the reference pressure cavity is oil-filled.

8. The differential pressure transducer of claim 1, wherein a first cavity is defined between the header and the housing, wherein the first cavity is in communication with the first pressure port and the first side of the diaphragm.

9. The differential pressure transducer of claim 8, wherein the first cavity is oil-filled.

10. The differential pressure transducer of claim 1, wherein the diaphragm is configured to receive the first pressure by a first oil-filled volume, and wherein the diaphragm is configured to receive the second pressure by a second oil-filled volume.

11. The differential pressure transducer of claim 1, wherein the sensor module is adapted to output a signal indicative of a difference between the first pressure and the second pressure.

* * * * *